US010054214B2

(12) United States Patent
Monnet et al.

(10) Patent No.: US 10,054,214 B2
(45) Date of Patent: Aug. 21, 2018

(54) CLIPPABLE SHUTTER WITH A DEFLECTOR SKIRT FOR A STEERING HOUSING

(71) Applicant: JTEKT EUROPE, Irigny (FR)

(72) Inventors: Roch Monnet, Brindas (FR); Caroline Gex, Lyons (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 15/822,041

(22) Filed: Nov. 24, 2017

(65) Prior Publication Data

US 2018/0073624 A1 Mar. 15, 2018

Related U.S. Application Data

(62) Division of application No. 14/649,201, filed as application No. PCT/FR2013/052898 on Nov. 29, 2013.

(30) Foreign Application Priority Data

Dec. 3, 2012 (FR) .................................... 12 61552
Aug. 20, 2013 (FR) .................................... 13 58317

(51) Int. Cl.
*F16H 57/039* (2012.01)
*B62D 3/04* (2006.01)
(Continued)

(52) U.S. Cl.
CPC ............. *F16H 57/039* (2013.01); *B62D 3/04* (2013.01); *B62D 5/0409* (2013.01);
(Continued)

(58) Field of Classification Search
CPC ...... B62D 3/04; B62D 5/0403; B62D 5/0409; B62D 5/0421; B62D 51/00; F16H 1/16;
(Continued)

(56) References Cited

U.S. PATENT DOCUMENTS 5,352,853 A   10/1994 Takagi
2009/0313910 A1  12/2009 Williams

FOREIGN PATENT DOCUMENTS

DE   102006024767 A1  11/2007
DE   102010050561 A1   5/2012
(Continued)

OTHER PUBLICATIONS

Feb. 9, 2017 Office Action issued in U.S. Appl. No. 14/649,201.
(Continued)

*Primary Examiner* — Thomas C Diaz
(74) *Attorney, Agent, or Firm* — Oliff PLC

(57) ABSTRACT

The invention concerns a device for protecting a steering mechanism of a vehicle, said device comprising a housing element defining a chamber of which the wall is perforated with at least one access opening, and a plastic cap that shuts said access opening, said cap having, along the director axis (XX') thereof, a stepped structure comprising a hub, which is engaged in a bore of the access opening and carries a sealing lining that engages with said bore, then a collar, of which the overall diameter is greater than the diameter of the bore, said collar being engaged by snap-fitting into a stop groove hollowed into the housing element, and forming a baffle deflector of which the diameter is greater than that of the bore.

9 Claims, 2 Drawing Sheets

(51) Int. Cl.

| | | |
|---|---|---|
| *B62D 5/04* | (2006.01) | |
| *F16H 1/16* | (2006.01) | |
| *F16H 57/12* | (2006.01) | |
| *F16H 55/24* | (2006.01) | |
| *B65D 51/00* | (2006.01) | |
| *F16H 57/029* | (2012.01) | |
| *F16H 57/021* | (2012.01) | |
| *F16H 57/022* | (2012.01) | |
| *F16H 57/02* | (2012.01) | |

(52) U.S. Cl.
CPC .......... *B62D 5/0421* (2013.01); *B65D 51/00* (2013.01); *F16H 1/16* (2013.01); *F16H 55/24* (2013.01); *F16H 57/029* (2013.01); *F16H 57/12* (2013.01); *F16H 2057/0213* (2013.01); *F16H 2057/0222* (2013.01); *F16H 2057/02082* (2013.01); *F16H 2057/127* (2013.01)

(58) Field of Classification Search
CPC ...... F16H 55/24; F16H 57/029; F16H 57/031; F16H 57/039; F16H 57/12
See application file for complete search history.

(56) References Cited

FOREIGN PATENT DOCUMENTS

| | | |
|---|---|---|
| EP | 2740874 A1 | 6/2014 |
| GB | 187338 A | 10/1922 |

OTHER PUBLICATIONS

Aug. 24, 2017 Office Action issued in U.S. Appl. No. 14/649,201.
Dec. 7, 2016 Office Action issued in U.S. Appl. No. 14/649,201.
Feb. 24, 2014 International Search Report issued in International Application No. PCT/FR2013/052898.

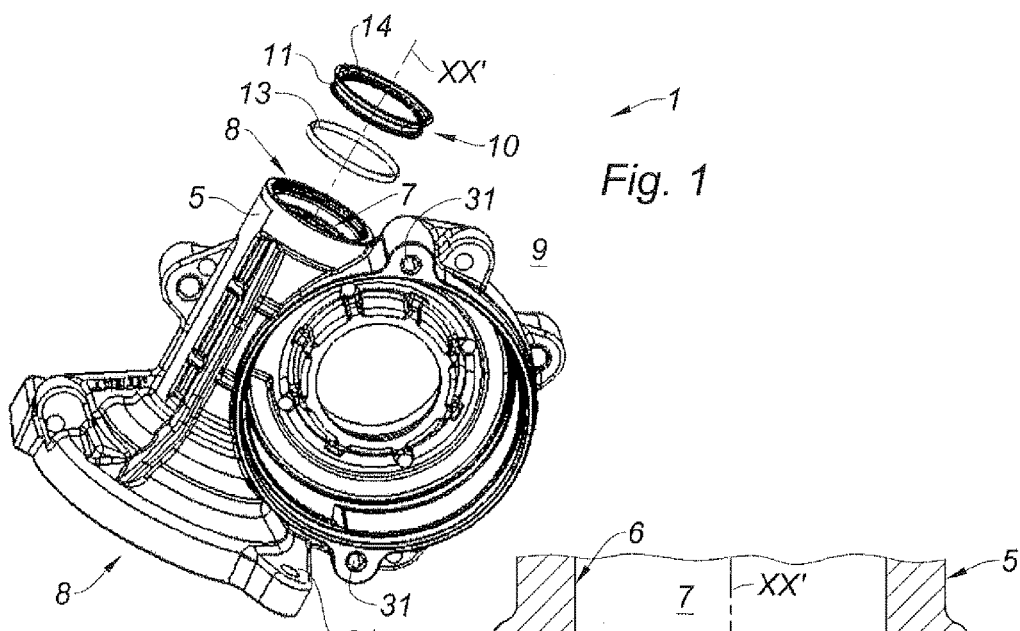
Fig. 1
Fig. 2
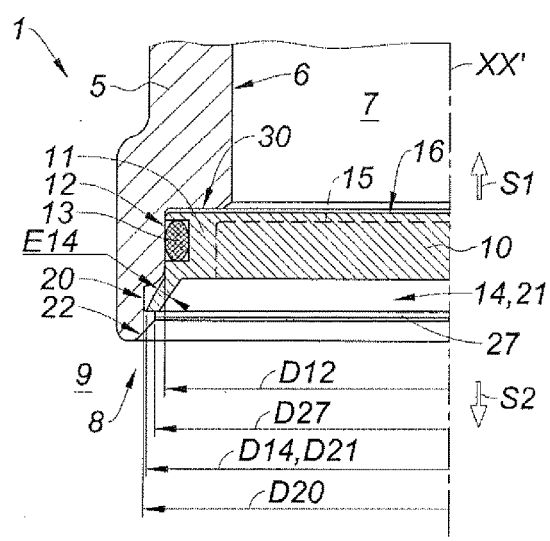
Fig. 3
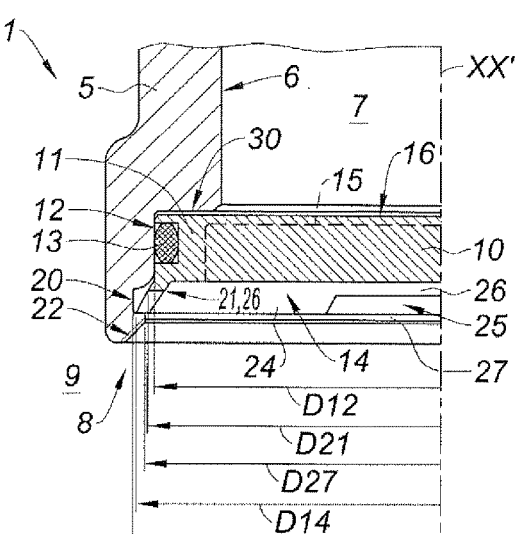
Fig. 4

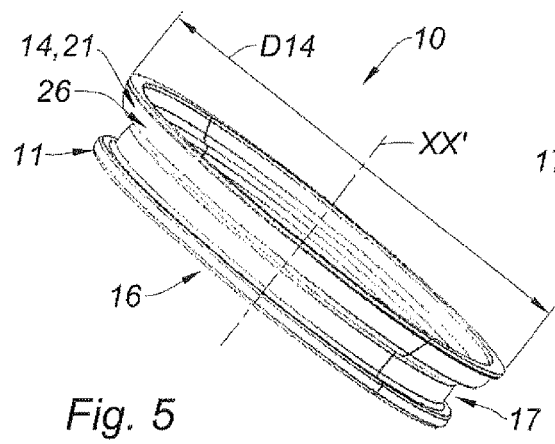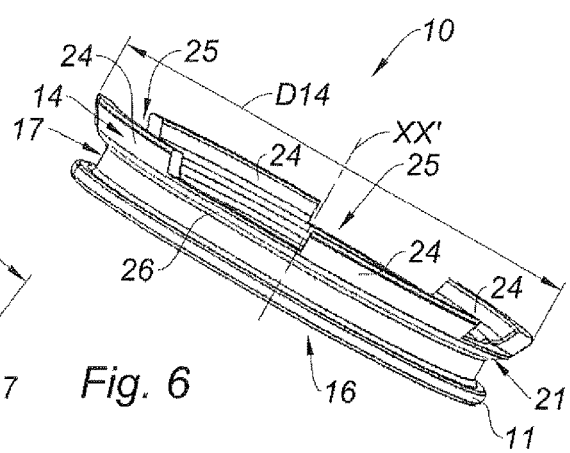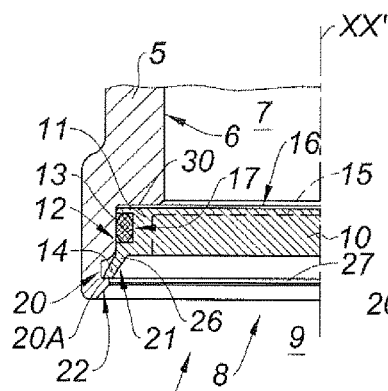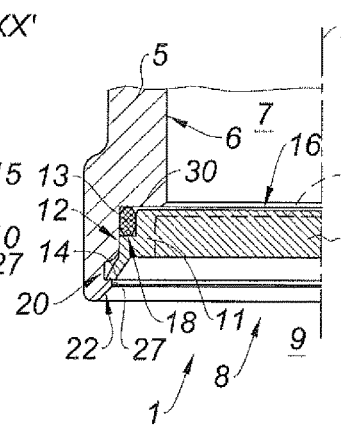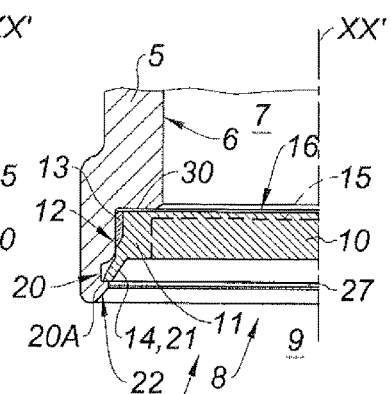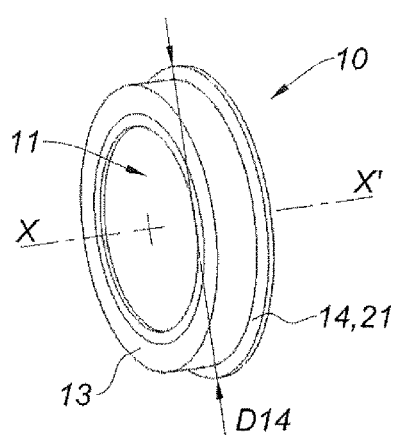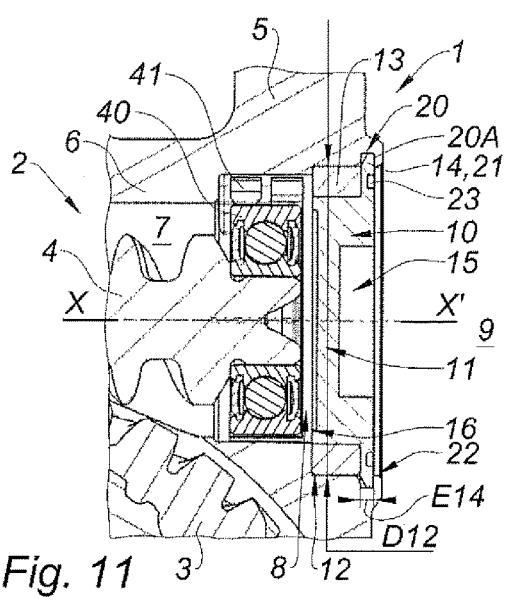

CLIPPABLE SHUTTER WITH A DEFLECTOR SKIRT FOR A STEERING HOUSING

This is a divisional of application Ser. No. 14/649,201 filed Jun. 2, 2015, which is a National Stage Application of PCT/FR2013/052898 filed Nov. 29, 2013, and claims the benefit of French Application Nos. 12/615552 filed Dec. 3, 2012 and 13/58317 filed Aug. 20, 2013. The entire disclosures of the prior applications are hereby incorporated by reference in their entirety.

TECHNICAL FIELD

The present invention concerns the general field of steering systems of vehicles, in particular power-assisted steering systems for motor vehicles, and more particularly the casings used for housing the steering mechanisms.

BACKGROUND

It is known to cover all or part of a steering mechanism, and in particular the gear transmission elements of such a mechanism, by a rigid casing which ensures guiding, protecting and/or maintaining in a lubricant said mechanism.

In order to enable the setting-up or the maintenance of the mechanism, for example draining or filling the lubricant, the casing is provided with one or several access orifice(s), which of course must be closed, in normal operation, so as to guarantee sealing of the casing.

To this end, threaded plugs, intended to be screwed in threaded ends of the access orifices, are generally used, or still further cowls provided with a plurality of peripheral fastening legs which are clamped by screws on the casing, in order to hide the considered orifices.

In either case, sealing is generally ensured by a seal, such as an O-ring seal, which is compressed by the plug or the cowl against the rim of the orifice.

However, this kind of closure is generally satisfactory from the functional point of view, but it may nonetheless present some drawbacks.

Indeed, multiplying the parts required for the closure (complex-shaped plug, seal, screw . . . ) tends to complicate the assembly of the casing, and to increase its manufacturing cost, as well as its weight and its overall dimension.

Furthermore, it is generally difficult to check, in particular visually, the proper setting of the closure elements, and in particular the positioning of the seal, so that sealing defects may sometimes occur or subsist without being detected immediately, which may be detrimental to the proper operation and to the longevity of the steering system.

BRIEF SUMMARY

Consequently, the invention aims at overcoming the aforementioned drawbacks and at proposing a new system for closing the casing, which is compact and lightweight, which ensures reliable and effective sealing, while remaining simple, quick and inexpensive to implement.

The invention more specifically provides a device for protecting a mechanism, such as a steering mechanism of a vehicle, said device comprising, on the one hand, an element of the casing which forms a wall delimiting a chamber which is intended to receive and accommodate said mechanism, said wall being pierced with at least one access orifice enabling access to the chamber from the outside of said casing element, and on the other hand, a plug which closes said access orifice, said device being characterized in that the plug presents an axially stepped structure, which comprises successively, along the main axis (XX') of said plug, a hub, which is engaged in a bore of the access orifice, said hub being oriented toward the chamber and carrying a sealing gasket which cooperates with said bore of the access orifice, then a flange, which is oriented toward the outside of the casing element and the overall diameter of which is larger than the diameter of the bore, said flange being, on the one hand, engaged to bear in a stop groove hollowed in the casing element radially offset with respect to the bore, so that said flange opposes, by snap-fitting, the extraction of the plug out of the access orifice, and said flange presenting, on the other hand, a solid portion which extends radially from the hub so as to form a deflector the diameter of which is larger than that of the bore, so that the deflector covers the circumference of said bore by defining a radial baffle which protects the hub and the sealing gasket.

The invention further provides a clippable plug made of a polymer material intended for the closure of a casing, said plug comprising a core made of a polymer material which integrally combines in one-piece, on the one hand, a hub, further provided with a sealing gasket made of elastomer material brought on the core, and on the other hand, a flange which protrudes radially outward of said hub so as to form both an elastic fastening clip, intended to cooperate by snap-fitting with the casing, and a deflector the diameter of which exceeds the overall diameter of the hub and of its sealing gasket.

Advantageously, using a clippable plug in accordance with the invention, which forms a simple, inexpensive to manufacture, lightweight and compact part, allows closing very simply and quickly the access orifice(s) of the casing, by simply pressing and nesting said plug under elastic stress.

In a particularly advantageous manner, sealing of the closure is automatically achieved when inserting the plug in the bore, since the sealing gasket, carried by the hub, is directly and properly centered and positioned to the contact of said bore.

Furthermore, this main sealing, ensured by the sealing gasket which conforms to the hub and to the bore between which said gasket is interposed, and between which said gasket is preferably elastically compressed, is advantageously enhanced by the presence of the deflector (or «jet breaker»), which forms a secondary baffle-type sealing member, and which thereby effectively protects the contact area between the bore of the orifice and the hub (and more particularly between the wall of the bore and the sealing gasket of said hub) from any direct exposure to dust, to various soiling or abrasive foreign bodies, or to projections of water.

By covering the annular junction area comprised between the hub and the bore and occupied by the sealing gasket, the deflector is in particular capable of deflecting a water jet used by a high pressure cleaner, and thereby avoiding that such a water jet forces its way between the plug and the bore of the casing and causes an interstitial pull-out of the sealing gasket, and hence a failure of the sealing of the closure, as well as a penetration of water in the chamber, which water penetration might cause seizing and/or corrosion of the mechanism.

It will be noted that the invention advantageously uses the same member, namely the flange, to form both an elastic fastening member on the one hand, capable of cooperating by snap-fitting with the casing so as to ensure maintaining the plug in position in said casing, and a deflector-type sealing enhancing member, on the other hand.

Thus, the arrangement specific to the invention allows simultaneously ensuring several functions, namely fastening and sealing, by means of one single part forming a plug that is lightweight and easy to handle, which allows optimizing the effectiveness and the cost of the closure.

Finally, fastening by snap-fitting of the plug, by means of a flange which remains visible from the outside of the casing, not only allows ensuring a robust mechanical strength of the plug, and in particular avoiding any pull-out of said plug, but it also facilitates the visual check of the assembly, by enabling the operator to immediately verify, at a glance, the proper engagement of the flange in the stop groove, as well as the condition of the plug (and in particular the absence of cracks in the hub), and this during the first mounting as well as during later periodic maintenance visits of the vehicle.

BRIEF DESCRIPTION OF THE DRAWINGS

Other features and advantages of the invention will appear in more detail upon reading the following description, with reference to the appended drawings, provided purely by way of non-limiting illustration, among which:

FIG. 1 illustrates an exploded perspective view of an embodiment of a protective device in accordance with the invention.

FIG. 2 illustrates a detailed longitudinal sectional view of the arrangement of the access orifice of a casing element in accordance with the invention.

FIGS. 3 and 4 illustrate detailed longitudinal half-sectional views of variants of plugs, respectively with monolithic solid truncated-cone shaped flange and slotted truncated-cone shaped flange, setting-up within an element of the casing presenting an access orifice of the type represented in FIG. 2.

FIGS. 5 and 6 illustrate perspective views of the plugs of FIGS. 3 and 4 respectively, the first plug having a solid truncated-cone shaped flange, and the second plug having a slotted truncated-cone shaped flange, subdivided into a plurality of snap-fitting tabs.

FIGS. 7, 8 and 9 illustrate detailed longitudinal half-sectional views of different possible arrangements of sealing gaskets carried by plugs in accordance with the invention, closing an access orifice according to FIG. 2.

FIG. 10 illustrates a perspective view of a variant of a plug in accordance with the invention, with a straight flange.

FIG. 11 illustrates a longitudinal sectional view of the plug of FIG. 10 closing a casing of a reducer with a worm wheel and a worm screw.

DETAILED DESCRIPTION

The invention concerns a device 1 for protecting a mechanism 2, such as a steering mechanism 2 of a vehicle, and more particularly a power-assisted steering mechanism 2.

In particular, said mechanism 2 may form a reducer, such as a gear reducer, including, for example, a worm wheel 3 driven by a worm screw 4, said worm screw being supported, for example, by a ball bearing 40 radially suspended by a leaf spring 41 (FIG. 11), or may further form any other motion conversion mechanism, and in particular any mechanism for operating a vehicle steering, including, for example, a pinion, driven by a steering wheel and/or a steering assist motor, which meshes on a steering rack slidably mounted in a steering casing and intended to be connected, via steering tie rods, to steered wheels, in order to be able to modify the steering angle of said steered wheels.

In a particularly preferred manner, said device 1 thereby forms a steering casing, or a sub-assembly of a steering casing, such as a casing element illustrated in FIG. 1 and designed to accommodate a steering pinion/rack connection.

According to the invention, the device 1 comprises, on the one hand, a casing element 5 which forms a wall 6 delimiting a chamber 7 which is intended to receive and accommodate the mechanism 2, said wall 6 being pierced with at least one access orifice 8 enabling access to the chamber 7 from the outside 9 of said casing element 5, and on the other hand, a plug 10 which closes said access orifice 8.

In particular, a function of the plug 10 is to close the access orifice 8 in a sealed manner, in order to avoid, on the one hand, any leakage to the outside 9 of the lubricant (grease or oil) which is used in the chamber 7 for lubricating the mechanism, and on the other hand, any intrusion, inside the chamber 7 of water, salt fog, dust or various particles coming from the outside 9 of the casing.

In a particularly preferred manner, the access orifice 8 will enable introduction and mounting, inside of the casing 5, of all or part of the mechanism 2, and for example, the aforementioned worm screw 4 and/or ball bearing 40.

Of course, a same casing element 5 may include several access orifices 8 leading to a same chamber 7, and each closed, when appropriate, by a plug 10 according to the invention, the diameter of which will correspond, on a case by case basis, to the diameter of the concerned orifice 8.

In particular, as is illustrated in FIG. 1, the chamber 7 may form a cylindrical through chamber, of the rectilinear jacket type, presenting at one of its ends (upper end in FIG. 1) a first orifice 8, here of a small diameter, and at its other opposite end (lower end in FIG. 1) a second orifice 8, here of a larger diameter, each of said orifices 8 being closed by a plug 10 having an appropriate size (the plugs being thereby mounted opposite to each other).

According to the invention, the plug 10 presents an axially stepped structure, which comprises successively, along the main axis (XX') of said plug, a hub 11, which is engaged in a bore 12 of the access orifice 8, said hub 11 being oriented toward the chamber 7 and carrying a sealing gasket 13 which cooperates with said bore 12 of the access orifice, then a flange 14, which is oriented toward the outside 9 of the casing element 5 and the overall diameter D14 of which is larger than the diameter D12 of the bore 12.

Preferably, the hub 11 of the plug 10 substantially presents a revolution shape about its main axis (XX').

Moreover, it will be considered that the main axis (XX') of the plug coincides with the generating axis of the bore 12, centered on said bore 12 and more generally centered on the access orifice 8, when said plug 10 is properly engaged in said access orifice 8.

By convention, the terms «axial» or «longitudinal» will refer to the dimensions and directions oriented along (or parallel to) the main axis (XX'), and the term «radial» will refer to the dimensions and directions oriented transverse (and more particularly perpendicular) to said main axis (XX').

Preferably, the lateral (solid) wall of the hub 11 presents a shape, preferably cylindrical with a circular base, and/or dimensions, which are substantially conjugated, by the insertion and guide clearance, to those of the bore 12.

Preferably, the hub 10 will be in the form of a monolithic cylinder, which may be solid, or which may be hollowed, in particular at the outer side 9, by a counterbore 15 (represented with dotted lines in FIGS. 3, 4 and 7 to 9), which will advantageously allow lightening the plug 10 and improving the functional elasticity thereof (in order to facilitate the snap-fitting of said plug).

Advantageously, the sealing gasket 13 may form an annular wiper seal, which completely wraps (surrounds) the hub 11, over the entire perimeter of said hub, by 360 degrees around its main axis (XX'), in order to fill the engagement gap which corresponds to the radial insertion clearance provided between the wall of said hub 11 and the wall of the bore 12.

According to a preferred variant, the sealing gasket 13 is formed by a coating made of elastomer material, preferably over-molded, which covers the hub 10, as shown in FIG. 9.

Advantageously, using such a sealing gasket 13 as an integral part of the plug 10, through manufacture, will simplify the handling of the plug 10, and hence enable a simplified, quick and reproducible mounting of said plug 10 on the casing element 5.

In particular, the sealing gasket 13 may be in the form of a peripheral strip which covers the curved lateral wall of the hub 11, as is illustrated in FIG. 9, and/or in the form of a flat washer, whether solid or recessed at its center, wherein said flat washer partially or fully covers the nose 16 of the plug, that is to say that said washer covers all or part (and in particular the edge) of the disc which forms the end wall 16 (nose) of said plug 10, wherein said end wall 16 is preferably normal to the main axis (XX').

According to another variant, the sealing gasket 13 may be formed by an O-ring seal brought on the hub 11.

Advantageously, said O-ring seal, initially distinct from the hub, will be brought on the hub 11 in a reversible manner, so as to remain interchangeable.

Said O-ring seal may then be housed in an annular groove 17 hollowed in the lateral wall of the hub 11 (FIGS. 3 to 7), which ensures an excellent securing of said seal after pre-assembly on the plug 10, and hence facilitates the setting-up of said plug 10, thus pre-equipped with its sealing gasket 13, in the orifice 8.

Alternatively, said O-ring seal may be housed against a shoulder 18 of the hub 11, which opens opposite to the flange 14 (FIG. 8), such a simultaneous bearing against the casing element 5 and the hub 11 will advantageously allow, when appropriate, ensuring an excellent sealing both radially and axially, by bidirectional (crossed) gripping of the O-ring seal.

Regardless of its shape, the sealing gasket 13 may be made of any elastomer material, and more particularly any appropriate thermoplastic elastomer material, such as a thermoplastic polyurethane (TPU).

Preferably, the sealing gasket 13 will be made in a material distinct from the constituting material of the hub 11, and preferably distinct from the constituting material of the flange 14, and more particularly in an elastomer material which is more flexible (with a lower Shore hardness) than the constituting material of the hub 11 and the constituting material of the flange 14, respectively.

This differentiation will allow combining a robust hub 11, forming a relatively rigid and stable support, with a very elastic sealing gasket 13 capable of effectively conforming, in a sealed manner, to the contour of the bore 12, while compensating, if needed, the asperities and irregularities of the latter.

According to the invention, as is visible in particular in FIGS. 3 and 4, the flange 14 is, on the one hand, bearing in a stop groove 20 hollowed in the casing element 5 radially (centrifugally) offset with respect to the bore 12, so that said flange 14 opposes, by snap-fitting, the extraction of the plug 10 out of the access orifice 8 (at least along the axial direction opposite to the insertion direction of the plug), and said flange 14 presents, on the other hand, a solid portion which extends radially from the hub 11 so as to form a deflector 21, the diameter D21 of which is larger than the diameter D12 of the bore 12, so that the deflector 21 covers the circumference of said bore 12 by defining a radial baffle which protects the hub 11 and the sealing gasket 13.

Advantageously, the deflector 21 forms a shield in centrifugal radial excrescence from the hub 11, which overhangs and thereby covers, preferably over the entire perimeter of the bore 12, without interruption, by 360 degrees around the hub, the interstitial gap delimited by the (convex) outer lateral wall of the hub 11, on the one hand, and the (concave) inner lateral wall of the bore 12 on the other hand, so as to protect this interstitial gap, and consequently, the sealing gasket 13 which lies therein, from direct projections of water or solid particles.

The sealing of the closure provided by the plug 10 is thereby enhanced.

The deflector 21, which forms a rim, preferably annular, in centrifugal radial projection from the hub 11 over the entire perimeter of said hub, advantageously coincides with all (FIGS. 3 and 5) or part (FIGS. 4 and 6) of the flange 14.

Preferably, the deflector 21, and more generally the flange 14, will be integrally formed with the hub 11.

In this respect, according to a preferred variant, the hub 11 and the flange 14 of the plug 10 are formed in one-piece in a polymer material, preferably made of polyamide (for example of the PA66-type) or of polyacetal (for example of the PolyOxyMethylene-type), optionally reinforced with fibers.

Thus, the hub 11/flange 14 assembly may form a core 11, 14 made of a hard, rigid or semi-rigid plastic, on which the sealing gasket 13 will be brought, and when appropriate, over-molded.

Such a core, particularly lightweight and inexpensive, will be easy to mass-produce by injection molding.

Advantageously, the invention allows using a same portion of the plug 10, for instance the flange 14, to ensure both fastening said plug 10 by elastic nesting in the casing, and reinforcing the sealing through the baffle.

Of course, regardless of the rest, the constituting material, the shape and the dimensions of the flange 14 will be adapted to its functions.

In particular, the arrangement of the flange 14 will provide said flange with an intrinsic flexibility as well as a rigidity, both sufficient to enable said flange to fulfill its role as a fastening clip, that is to say to enable said flange to retract, and more particularly to contract, so as to pass through the mouth 22 of the orifice 8 and to be inserted, and more particularly to be (radially) deployed again in the stop groove 20 once said mouth 22 is crossed.

Once placed in the stop groove 20, the flange 14, and more particularly the crown that marks the free extreme rim of said flange, will ensure mechanical maintaining of the plug 10 by axial anti-return blocking.

More particularly, the free end of the flange 14 will bear against a wall called «stop rim» wall 20A of the stop groove 20, which stop rim 20A forms a shoulder-type axial stop (in centripetal radial protrusion with respect to the bottom of said stop groove 20), said axial stop thereby opposing the axial (backward) displacement of said flange 14, and more generally of the plug 10, along the extraction direction (that is to say along the direction away from the chamber 7).

Hence, the hub 11, and more particularly the lateral wall of said hub, may be devoid of fastening elements, and in particular devoid of thread, and therefore present a smooth aspect, which will further simplify the manufacture of the plug 10, in particular by molding.

Advantageously, using a snap-fitting fastening involving a stop groove 20 and a flange 14 which remain clearly visible from the outside 9 after mounting enables quick and reliable visual inspection of the position of the plug 10 with respect to the casing 5, and therefore the sealing and the resistance of the assembly, which allows detecting and correcting immediately any possible anomaly.

Furthermore, fully sinking the plug 10 in the access orifice 8, and nesting the flange 14 in a stop groove 20 arranged on the casing 5 itself, allows entirely hiding the plug 10 in said casing 5, and more particularly placing the flange 14 (axially) set back from the apparent surface of the casing 5, and thereby preventing any pull-out or inadvertent extraction of the plug 10 by an obstacle or a tool which would accidentally rub said apparent surface of the casing 5.

More particularly, such an arrangement, which uses the casing 5 to protect the access to the plug 10, allows for a particularly safe mounting of said plug 10, because said mounting is not spontaneously reversible, and even irreversible (indeed, dismounting requires a voluntary intervention of a mechanic inside the access orifice 8 and results in damaging or destroying the plug 10).

According to a possible variant of the invention, illustrated in FIG. 11, the flange 14 may be in the form of a disc, preferably with a constant thickness, which extends straight, that is to say substantially normal to the main axis (XX').

Advantageously, a circular weakening score 23, concentric with the rim of the flange 14, may then further improve the flexibility of said flange 14, in a hinge-like fashion.

As example, in such case, the rough thickness E14 of the flange 14 may be comprised between 1 mm and 2 mm, and the (axial) depth of the weakening score 23 may be comprised between 0.5 mm and 1.5 mm.

Nonetheless, in a particularly preferred manner, and as is illustrated in FIGS. 3 to 9, the flange 14 is slanted with respect to the main axis (XX') of the plug 10 so as to form a truncated-cone shaped skirt the summit of which is oriented toward the chamber 7.

Advantageously, such a configuration of the flange, which thus forms some kind of a flexible pressing tip, facilitates the insertion and setting-up of the plug 10 in the casing element 5, on the one hand by improving the flexural capability of the flange (when contracted and then when deployed again) during snap-fitting, along the «forward» direction S1 of sinking the truncated cone, and on the other hand by enhancing the mechanical resistance of the plug to pull-out along the «blocking» direction S2, by providing a solid seating, and finally by achieving an auto-centering effect when sinking the plug 10, which auto-centering effect allows in particular avoiding damaging the sealing gasket 13 by crush, shear or abrasion.

Preferably, regardless of the flange's orientation (straight or slanted), the flange 14 will present a substantially constant thickness E14, which may for example be comprised between 1 mm and 2 mm (in particular for typical hub 11 diameters and/or flange diameters D14 in the order of 30 mm to 120 mm).

According to an implementation variant, the flange 14 is slotted, from its free end up to the smallest outer radial limit of the deflector 21, so as to be subdivided into a plurality of snap-fitting tabs 24, as is visible in particular in FIGS. 4 and 6.

Advantageously, such a crenellated cutting of the crown of the flange 14 allows improving the flexibility of the remaining tabs 24 (preferably evenly distributed over the circumference of the flange 14), which thereby become independent from one another in flexion, in order to facilitate snap-fitting, without nevertheless giving up sealing, since the annular portion which forms the root 26 of the flange 14, that is to say the base of said flange 14 by which said flange is connected to the hub 11, is preserved and acts as a deflector 21.

In this configuration, the smallest radial limit of the deflector (denoted as D21 in FIG. 4) then corresponds to the diameter of the bottom of the slots 25 which separate the tabs 24, that is to say the overall diameter of the root 26, wherein said roots forms the beginning of the flange 14. Nonetheless, this diameter D21 of said root 26 remains (strictly) larger than the diameter D12 of the bore 12, thus advantageously avoiding any interruption of the protective cover.

Advantageously, regardless of the arrangement of the flange 14, whether continuous or crenellated (slotted), said flange will therefore always comprise a saucer-like deflector 21 forming, a jet breaker axially facing the bore 8 and capable of notably resisting «high-pressure» water cleaners.

Preferably, the access orifice 8 presents a truncated-cone shaped mouth 22 overhanging the stop groove 20 and the summit of which is oriented toward the chamber 7, the small base 27 (or «neck») of said mouth 22 presenting a diameter D27 which is (strictly) larger than the diameter D12 of the bore 12 and (strictly) smaller than the overall diameter D14 of the flange 14, as well as (strictly) smaller than the bottom diameter D20 of the stop groove 20, as notably shown in FIGS. 3 and 4.

In this case, as notably shown in FIGS. 2 to 4: D12<D27<D20, with in addition, D12<D21≤D14, and D27<D14 (and, necessarily, D21≤D14≤D20).

Such an arrangement of the access orifice 8, which flares through a succession of stages (the bore 12, the stop groove 20, then the mouth 22, these two latter being in centripetal radial set-back with respect to said bore 12) allows clearing the access of the plug 10, at the access orifice 8, and at the bore 12, and more particularly, avoiding, when inserting the plug 10, the risk of interference (by contact) between the sealing gasket 13, optionally covered with grease, and the stop groove 20, thereby guaranteeing cleanliness of said stop groove 20 when snap-fitting occurs and minimizing the risk of damaging the sealing gasket 13 (by cutting or by abrasion).

Particularly, it will be noted that the axially inner edge of the stop groove 20, the diameter of which corresponds to the diameter D12 of the bore, is narrower (that is to say with a smaller diameter) than its axially outer edge, which corresponds to the neck 27 of the mouth 22 and which delimits the stop rim (seating rim) 20A, radially protruding over the bottom of the stop groove 20, and with which the flange 14 cooperates, by snap-fitting, when said flange is radially deployed again after having been contracted when crossing the collar 27 of the mouth 22.

Moreover, the truncated-cone shape feature of the mouth 22 pointing toward the chamber 7 also contributes to facilitate the approach and centering of the plug 10 during mounting.

In particular, this truncated-cone shaped arrangement will facilitate, in a funnel-like fashion, the flexural contraction of the flange 14, and more particularly the flexural contraction of the truncated-cone shaped skirt, which is brought to cooperate with the mouth 22, by sliding, so as to cross the collar 27 (along the snap-fitting «forward» direction S1).

Preferably, the bore 12 of the access orifice 8 is limited by a bottom shoulder 30, in (centripetal) radial set-back, which forms an axial abutment against the hub 10, opposite to the flange 14, in order to stop sinking the plug 10 in said access orifice 8.

Ultimately, the plug 10 may thus be axially blocked (and more particularly gripped), by being bidirectionally retained (along the snap-fitting forward direction S1 and along the snap-fitting blocking direction S2, at the same time), and therefore retained in a very stable manner, between the stop groove 20, and more particularly the collar 27 of the mouth 22, by its flange 14 on the one hand, and the bottom shoulder 30, by its nose 16 pressed against said shoulder 30 on the other hand.

Advantageously, the gripping effect will be achieved by an axial compressive stress resulting from the residual elastic deformation of the flange 14. Thus, said flange 14, by bearing on the stop rim 20A at one side of the plug, will tend to axially compress the nose 16 of said plug against the bottom shoulder 30 located at the opposite side, in a spring-like fashion.

Of course, the nominal height (axial dimension) of the plug 10 at rest, before deformation of the flange 14, will be adapted for this purpose depending on the distance which separates, within the casing 5, the bottom shoulder 30 from the collar 27 of the mouth 22.

Advantageously, the bottom shoulder 30 may also provide an axial (compression) bearing to the sealing gasket 13, as is mentioned above in particular with reference to FIG. 8.

Of course, it may be considered, without departing from the scope of the invention, to use any other type of axial stop (pin, elastic ring, etc.) fulfilling the same role as the bottom shoulder 30 by blocking all or part of the cross section of the bore 12.

Preferably, the casing element 5 is made in a metal alloy, such as an aluminum or magnesium alloy, preferably in one-piece.

The selection of such light metal alloy will allow reconciling robustness and lightweight.

Preferably, the casing element 5 also includes fastening members 31, such as passageways for screws and/or threaded inserts, enabling attaching and fastening said casing element 5 to other casing elements, for example a guide tube for the rack, so as to enable reconstituting a complete casing which will form a protected, sealed and lubricated enclosure, allowing to effectively isolate the mechanism 2 from its environment.

Of course the invention relates, as such, to a plug 10 according to either one of the possible variants of the invention.

More particularly, the invention concerns a clippable plug 10 made of polymer material intended to close a casing 5, said plug comprising a core 11, 14 made of polymer material which combines in one-piece, on the one hand a hub 11, further provided with a sealing gasket 13 made of elastomer material brought on the core, and on the other hand a flange 14 which protrudes radially outward of said hub 11 so as to form both an elastic fastening clip, intended to cooperate with the casing 5 by snap-fitting, and a deflector 21 the diameter D21 of which exceeds the overall diameter of the hub 11 and its sealing gasket 13 (this means, in practice, the diameter D12 of the aforementioned bore 12).

Preferably, the hub 11 presents a non-threaded smooth lateral wall, which receives an annular sealing gasket 13.

Moreover, regardless of its shape, as described above, the sealing gasket 13, in turn, is preferably made in an elastomer material, distinct from the constituting material of the hub 11, and more generally distinct from the constituting material of the core 11, 14, the constituting material of the sealing gasket 13 being preferably more flexible than the constituting material of the hub 11 (and in particular with a lower Shore hardness).

Preferably, as has been already mentioned above, the flange 14 of said plug 10 is slanted with respect to the main axis (XX') of said plug so as to form a truncated-cone shaped skirt which flares from the hub 11.

Moreover, the invention covers of course a casing element 5 provided with an access orifice 8 adapted for receiving a plug 10 in accordance with the invention, and presenting for this purpose either one of the aforementioned features, and more particularly having the stepped and progressively flaring feature of the orifice 8, considered from the bore 12 up to the mouth 22, through the stop groove 20.

The invention also covers a steering system, in particular a power-assisted steering system, comprising a casing 5 according to the invention forming a steering casing.

Finally, the invention covers a motor vehicle, in particular a motor vehicle with driving wheels and steered wheels intended for example for transporting persons, which is equipped with such a steering system, and more particularly, with a steering casing comprising (or constituting) a protective device 1 according to the invention.

Of course, the invention is by no way limited to the described variants, those skilled in the art being in particular capable of isolating or freely combining together either one of the features mentioned in the foregoing, or substituting them with equivalent features.

The invention claimed is:

1. A device for protecting a mechanism, said device comprising,
    a casing element which forms a wall delimiting a chamber which is intended to receive and accommodate said mechanism, said wall being pierced with at least one access orifice enabling access to the chamber from an outside of said casing element, and
    a plug which closes said access orifice,
    wherein the plug presents an axially stepped structure, which comprises successively, along a main axis of said plug, a hub, which is engaged in a bore of the access orifice, said hub being oriented toward the chamber and carrying a sealing gasket which cooperates with said bore of the access orifice, then a flange, which is oriented toward the outside of the casing element and an overall diameter of which is larger than a diameter of the bore, wherein the plug is sunk into the access orifice so that the flange is placed set-back with respect to an apparent surface of the casing, wherein said flange forms an elastic clip engaged to bear in a stop groove hollowed in the casing element radially offset with respect to the bore, so that said flange opposes, by snap-fitting, the extraction of the plug out of the access orifice, and wherein said flange also presents a solid portion which extends radially from the hub so as to form a deflector, a diameter of which is larger than the diameter of the bore, so that the deflector covers a circumference of said bore by defining a radial baffle which protects the hub and the sealing gasket,
    wherein the flange is slotted, from a free end up to a smallest outer radial limit of the deflector, so as to be subdivided into a plurality of snap-fitting tabs, while preserving an annular root by which said flange is fastened to the hub and wherein a diameter of said annular root is larger than the diameter of the bore so that said root acts as a deflector, and wherein the sealing gasket covers a curved lateral wall of the hub, in an interstitial gap delimited by an outer lateral wall of the hub and an inner lateral wall of the bore, the annular root covering an entire perimeter of the hub so as to protect the interstitial gap.

2. The device according to claim 1 wherein the flange is slanted with respect to the main axis of the plug so as to form a truncated-cone shaped skirt which flares from the hub and a summit of which is oriented toward the chamber.

3. The device according to claim 1 wherein the access orifice presents a truncated-cone shaped mouth which overhangs the stop groove and a summit of which is oriented toward the chamber, a small base of said mouth presenting a diameter larger than the diameter of the bore, and smaller than an overall diameter of the flange and smaller than a bottom diameter of the stop groove.

4. The device according to claim 1 wherein the bore of the access orifice is limited by a bottom shoulder, in radial set-back, which forms an axial abutment against the hub, opposite to the flange, in order to stop sinking the plug in said access orifice.

5. The device according to claim 1 wherein the hub and the flange of the plug are formed in one-piece in a polymer material.

6. The device according to claim 1 wherein the sealing gasket is formed by a coating made of elastomer material which covers the hub, or by an O-ring seal brought on said hub, said O-ring seal being housed either in an annular groove hollowed in the lateral wall of the hub, or against a shoulder of the hub which opens opposite to the flange.

7. The device according to claim 1 wherein the casing element is formed in a metal alloy.

8. The device according to claim 1 wherein the flange bears on the stop groove by a free end of said flange so as to ensure maintaining the plug by axial anti-return blocking.

9. A combination comprising the device according to claim 1 and a steering mechanism of a vehicle received and accommodated within said chamber.

* * * * *